Figure 1:
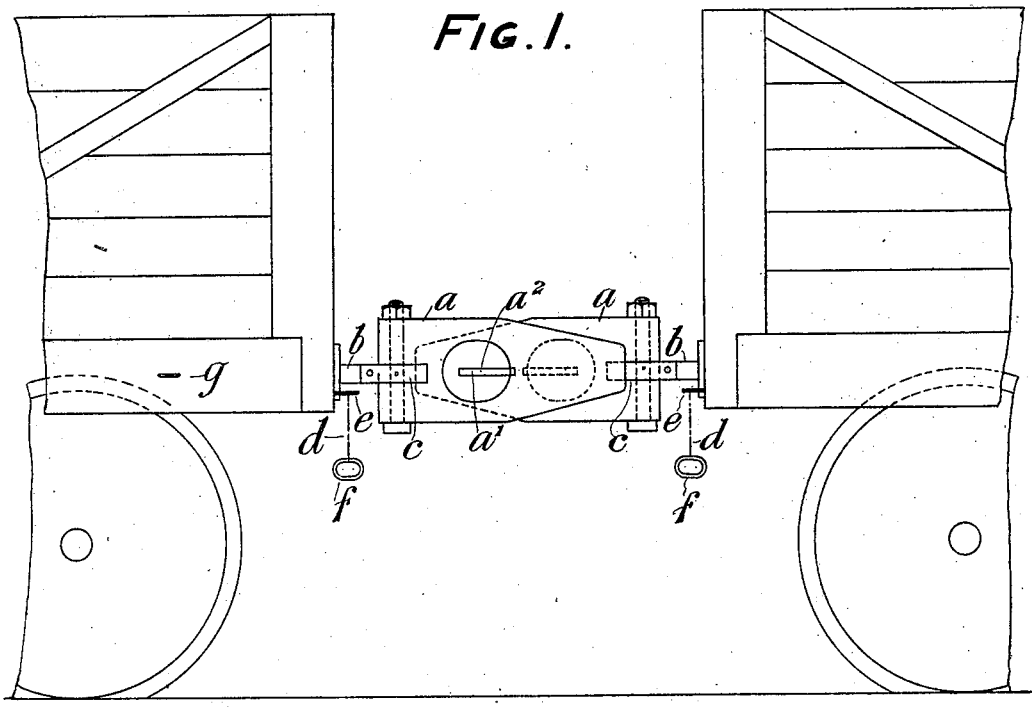

No. 835,914. PATENTED NOV. 13, 1906.
R. B. PARSONS.
AUTOMATIC COUPLING FOR RAILWAY AND OTHER CARRIAGES.
APPLICATION FILED MAY 14, 1906.

3 SHEETS—SHEET 1.

Witnesses.
Inventor:
R. B. Parsons.
Attorneys.

No. 835,914. PATENTED NOV. 13, 1906.
R. B. PARSONS.
AUTOMATIC COUPLING FOR RAILWAY AND OTHER CARRIAGES.
APPLICATION FILED MAY 14, 1906.
3 SHEETS—SHEET 2.
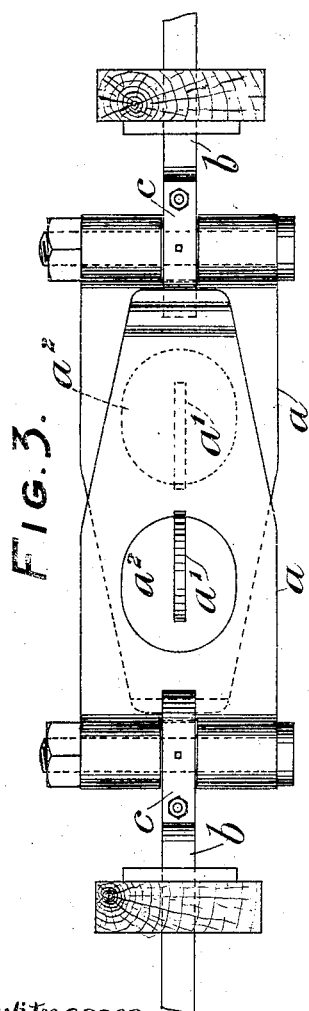
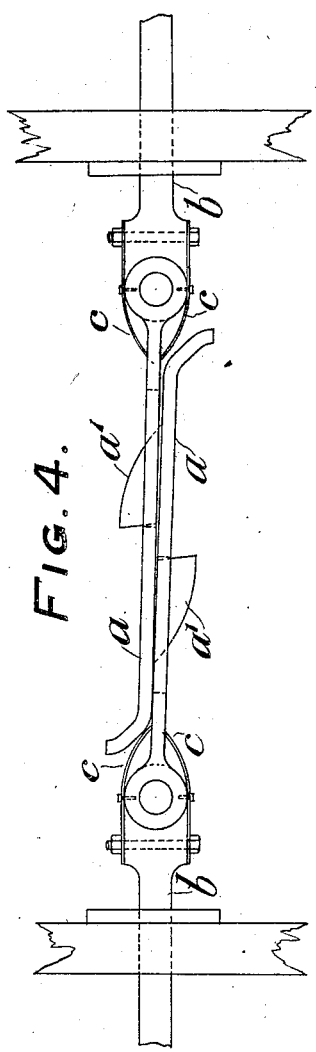
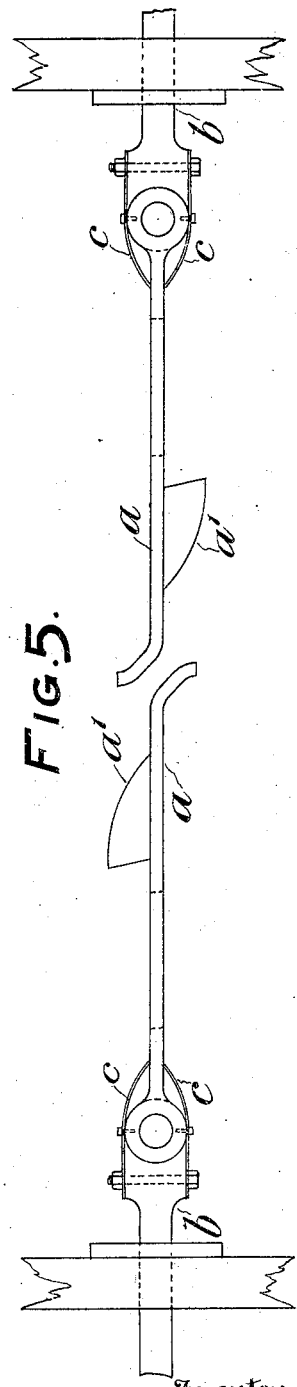
Witnesses.
W. Max. Duvall
Geo. L. Dary
Inventor:
R. B. Parsons.
his Attorneys
THE NORRIS PETERS CO., WASHINGTON, D.C.

No. 835,914. PATENTED NOV. 13, 1906.
R. B. PARSONS.
AUTOMATIC COUPLING FOR RAILWAY AND OTHER CARRIAGES.
APPLICATION FILED MAY 14, 1906.
3 SHEETS—SHEET 3.
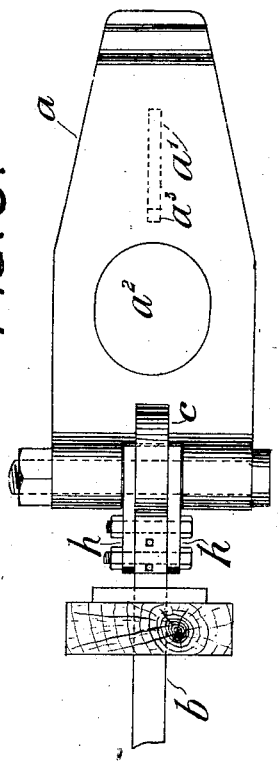
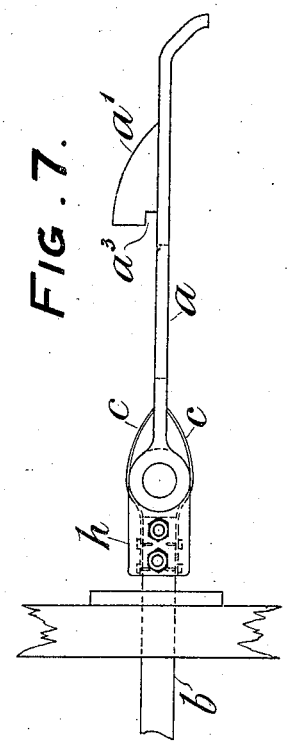
Witnesses.
W. May. Duvall.
Geo. L. Cary.
Inventor:
R. B. Parsons.
by Williamson Fithe
his Attorneys.

UNITED STATES PATENT OFFICE.

REGINALD BOWDEN PARSONS, OF HULL, ENGLAND, ASSIGNOR OF ONE-FOURTH TO FREDERICK BLACKITH AND ONE-FOURTH TO HERBERT DUNKERLEY, OF HULL, ENGLAND.

AUTOMATIC COUPLING FOR RAILWAY AND OTHER CARRIAGES.

No. 835,914.

Specification of Letters Patent.

Patented Nov. 13, 1906.

Application filed May 14, 1906. Serial No. 316,789.

*To all whom it may concern:*

Be it known that I, REGINALD BOWDEN PARSONS, a subject of the King of Great Britain and Ireland, residing at Hull, in the county of York, England, have invented certain new and useful Improvements in Automatic Couplings for Railway and other Carriages; and I do hereby declare the following to be a full, clear, and exact description of the invention, such as will enable others skilled in the art to which it appertains to make and use the same.

This invention relates to an automatic coupling for railway-carriages and other vehicles, and is designed to be easily uncoupled from the sides of the carriages, whereby much labor is saved, and danger to life and limb averted.

The coupling is very simple in construction and adapted to be attached directly to the draw-bar of the carriage. When the carriages are shunted together, they at once lock themselves automatically without the intervention of any labor, a spring being attached to each side of the pivoted connection between the draw-bar and coupling-plate, so that while the sidewise movement of each plate is sufficient to impart the requisite flexibility to the coupling for rounding curves, such sidewise movement is so far restrained as to prevent one coupling from at any time presenting the wrong face to the other, thereby securing a proper working of the coupling under all conditions.

In carrying my invention into effect the coupling consists of a plate which is mounted in front of the carriage end by being pivotally connected directly to the draw-bar of the carriage. Each coupling-plate is furnished with a hook and an opening to engage with a corresponding opening and hook in the other coupling-plate, the said coupling-plates being furnished with springs on either side of the draw-bar so as to have a constant tendency to keep the coupling-plates in line for locking together when the carriages are shunted together, the interlocking being automatic. By drawing the coupling-plates apart, which is done as hereinafter described, from the side of the carriage the interlock is removed and the carriages are uncoupled.

Having thus indicated the nature and utility of my invention, in order that it may be clearly understood and readily carried into effect, I will proceed to further describe the same with reference to the accompanying drawings, in which—

Figure 2:
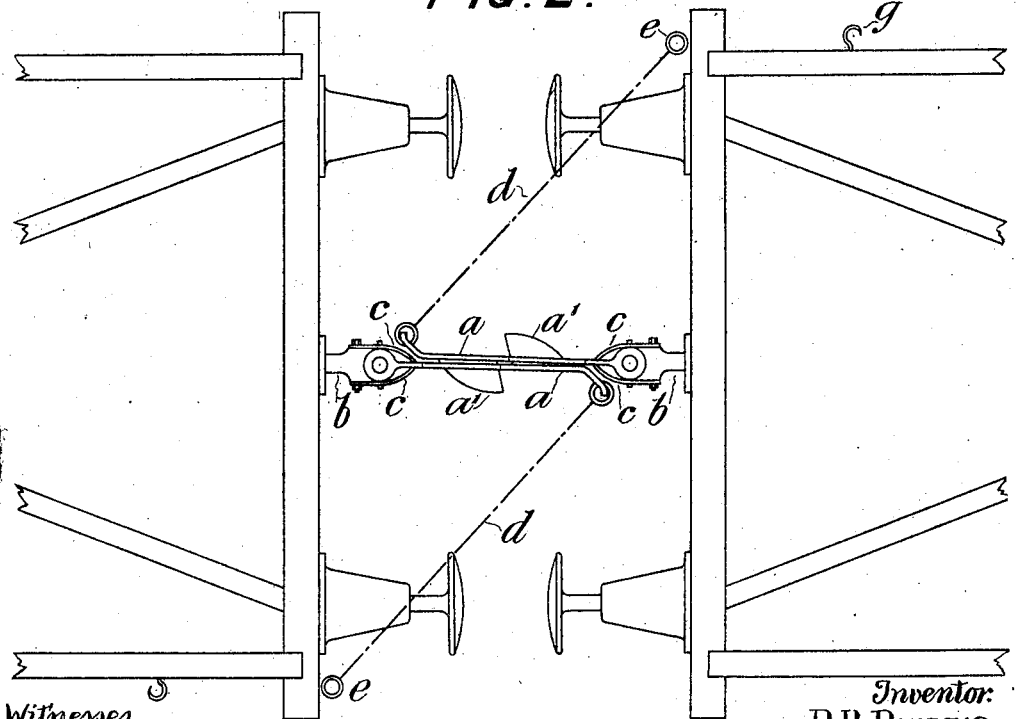

Figure 1 is a side elevation, and Fig. 2 a corresponding plan view, of two railway-carriages coupled together in accordance with my invention. Figs. 3 to 7 are detail views, drawn to a larger scale, illustrating the coupling-plates and the method of fixing them to draw-bars, Fig. 3 being a side elevation and Fig. 4 a corresponding plan view of the coupling-plates locked together, while Fig. 5 is a plan view of two coupling-plates in their normal position ready to be coupled when the carriages are shunted together. Fig. 6 is a side elevation, and Fig. 7 a corresponding plan, of a coupling-plate having the form of the hook slightly modified.

As shown in the drawings, the coupling consists as follows: A plate $a$ is mounted in front of the carriage end by being pivotally connected directly to the draw-bar $b$ of the carriage. This coupling-plate is made of cast-steel or any other suitable material, toward the outer end of which is furnished a hook $a'$ and more inwardly an opening $a^2$, each of which registers or engages with a corresponding opening and a hook, respectively, on the coupling-plate of the adjoining vehicle when the carriages are shunted together, whereby they are thereupon automatically locked or coupled together. Each coupling-plate and draw-bar is provided with springs $c$, one on either side of their pivoted connection, so as to have a constant tendency to project the coupling-plates in line for locking together when the carriages are shunted as well as to combine with the requisite flexibility in rounding curves, a check to a too-great angular deviation of the plate on its pivot, which might result in the wrong face of one plate being presented to another, and to thereby secure a proper working of the coupling under all conditions. The elongated holes or openings $a^2$ in the coupling-plates are made sufficiently wide to allow for any difference in the height of the carriages or to allow for the springs of one carriage having become more depressed by wear than those of the other. As a convenient means for disengaging the coupling from either side of the carriage a chain $d$ is attached to the outer or free end of each coupling-plate, which chain is led through an eye $e$, screwed into the end of the carriage, and terminates in a link $f$. By pulling either of the chains its respective coupling-plate is drawn away from its partner, and the hooks $a'$ disengage with their respective openings $a^2$. The uncoupling is then complete. A pin $g$, inserted in the side of the carriage to place the link $f$ on, when desired, will prevent the coupling from reengaging.

The working of the coupling is as follows: Before coupling, the plate on the draw-bar of one carriage and the plate on the draw-bar of the other carriage occupy the position as shown in Fig. 5. When shunting the carriages together, the outer ends of the plates, which are suitably inclined for the purpose, collide and slide over each other until the hooks engage with their respective openings, as shown in Figs. 3 and 4, thereby interlocking the two plates and coupling the carriages together.

Changes in the form, proportion, or any of the minor details of construction may be resorted to without departing from the principle or sacrificing any of the advantages of the invention. For instance, the couplings may be attached to the existing draw-bars of carriages with small alterations thereto, or new draw-bar ends of the kind shown in Figs. 1 to 5, inclusive, may be inserted at approximately the same cost. When existing draw-bars are used, the hook end is cut off and two plates $h$ $h$ attached thereto to engage with the coupling, as shown in Figs. 6 and 7, the springs $c$ being fitted between the said plates. Furthermore, I would have it understood that while the springs shown for projecting the coupling-plate straight out in line with its draw-bar are a convenient device for effecting this purpose I do not confine myself to such precisely as described and shown, as other springs could be devised and employed to produce the same result. I would also have it understood that the means for drawing one coupling-plate apart from the other is open to modification, so long as the required pull can be applied to the proper coupling-plate from the proper side of the carriage, but the tensile appliance, as hereinbefore described and illustrated, is thought to be a simple, effective, and convenient appliance for the purpose.

All the couplings are formed and fixed one way, not right and left handed, which is important in the case of automatic couplings, as either end of any vehicle is then adapted to be coupled with either end of any other vehicle.

Having thus described my invention, what I desire to secure and claim by Letters Patent of the United States is—

In an automatic coupling for railway and other carriages, coupling-plates pivotally connected to the draw-bars of said carriages and provided with openings and hooks, said hooks being adapted to engage within said openings, spring-arms attached to the said draw-bars and bearing against said coupling-plates beyond their pivot to hold them alined toward one another, said coupling-plates being provided with outwardly-inclined free ends, and means attached to the extremity of each of said plates and operated from the sides of the carriages for disengaging said coupling-plates, substantially as described.

In testimony whereof I affix my signature in presence of two witnesses.

REGINALD BOWDEN PARSONS.

Witnesses:
M. DIXON,
CHARLES LARARD.